United States Patent
Weatherbee et al.

(10) Patent No.: US 10,401,838 B2
(45) Date of Patent: Sep. 3, 2019

(54) APPARATUS AND METHOD FOR PRODUCTION LINE CHANGEOVER

(71) Applicant: General Electric Company, Schenectady, NY (US)

(72) Inventors: Paul Weatherbee, Edmonton (CA); Peter Sage, Albany, NY (US)

(73) Assignee: General Electric Company, Schenectady, NY (US)

( * ) Notice: Subject to any disclaimer, the term of this patent is extended or adjusted under 35 U.S.C. 154(b) by 305 days.

(21) Appl. No.: 15/367,928

(22) Filed: Dec. 2, 2016

(65) Prior Publication Data
US 2018/0157244 A1    Jun. 7, 2018

(51) Int. Cl.
G05B 19/414    (2006.01)
G05B 19/418    (2006.01)

(52) U.S. Cl.
CPC ........ G05B 19/41865 (2013.01); *Y02P 90/20* (2015.11)

(58) Field of Classification Search
CPC ........ G05B 19/414; G05B 2219/32208; G05B 13/026; G05B 2219/25419; G05B 13/021; G05B 13/042; G06Q 10/0631; B21B 37/76; B21B 1/26
See application file for complete search history.

(56) References Cited

U.S. PATENT DOCUMENTS

| | | | | |
|---|---|---|---|---|
| 4,818,622 A * | 4/1989 | Bravet | ................ | B32B 17/1077 428/425.6 |
| 5,336,043 A * | 8/1994 | Bader | ..................... | B65B 57/20 198/429 |
| 6,324,749 B1 * | 12/2001 | Katsuura | ............... | B23P 21/004 29/402.01 |
| 2007/0095494 A1 * | 5/2007 | Pihola | .................... | G05B 15/02 162/198 |
| 2013/0166055 A1 * | 6/2013 | Ishibashi | ................ | G06Q 10/08 700/100 |

* cited by examiner

*Primary Examiner* — Shahed Ahmed
(74) *Attorney, Agent, or Firm* — Fitch Even Tabin & Flannery LLP

(57) ABSTRACT

A production line is organized into one or more of zones. One or more production orders to produce products in a continuous sequence at a production line is accepted. A plurality of production factors associated with the production orders is analyzed to produce an operating schedule for the production line. The operating schedule, when followed at each zone of the production line, is effective to produce the plurality of products in the continuous sequence. Industrial machines in each of the zones are operated according to the schedule.

12 Claims, 18 Drawing Sheets

APPARATUS AND METHOD FOR PRODUCTION LINE CHANGEOVER

BACKGROUND OF THE INVENTION

Field of the Invention

The subject matter disclosed herein generally relates to manufacturing products on a production line and, more specifically, scheduling these products on the line.

Brief Description of the Related Art

Some types of industrial machines are used to perform various manufacturing operations and tasks. For instance, some machines are used to create and finish parts associated with wind turbines. Other machines are used to create mechanical parts or components utilized by vehicles. Still other machines are used to produce electrical parts (e.g., resistors, capacitors, and inductors to mention a few examples). Typically, industrial machines are controlled at least in part by computer code (or a computer program) that is executed by a processor that is located at the machine.

The machines are sometimes used on manufacturing production lines to make products. The production lines themselves can be used to produce multiple products at different times. For instance, a production line may produce a first product during a first time period, and then switch to producing a second product during a second time period. In current approaches, the scheduled production quota for a first product must be completed before the production line is changed over for production of a second product on the same line. Due to the scale of the production lines, the number of machines on the lines, and other issues this leads to time delays, wasted materials, increased cost and inefficiencies of the production line.

Additionally, different products that are being produced are often randomly scheduled leading to inefficiencies on the line. For example, a line may produce hair conditioner, then mouthwash, then shampoo, then mouthwash again. This schedule is inefficient since production of the mouthwash requires the cleaning of machines (since mouthwash is put into the mouth of a human) and, in this case, two cleanings are needed.

Previous attempts to address these problems have been made, but have not been successful.

BRIEF DESCRIPTION OF ASPECTS OF THE INVENTION

The present invention is directed to efficiently managing production through efficient changeover changing over the production of products on a production line. In some embodiments, the invention described herein may schedule the changeover so that the production of one product need not be completed before the production of a second product is started. In other embodiments, the product planning may be optimized to minimize changeover time and otherwise take advantage of production factors to optimize production and/or scheduling. The invention herein may optionally be implemented using a computerized industrial internet of things analytics platform that may be deployed at the location of the manufacturing process, at the manufacturing facility premise, or in the cloud.

In aspects, a production line may include a production line controller (controlling the entire production line) and various zone controllers (controlling portions of the production line). Multiple production orders (e.g., with each order has a single product) may be received. Multiple products are produced on the line. Changeover between products being produced on the line occurs such that the production of one product need not be completed before production can begin on the next product.

In these regards, the different zones can produce different products. As different products are created on the production line, a counter or RFID puck may be used on the line to separate or keep track of product types as the products move through the line and through the zones. As the products move through the line, each zone changes over to produce a particular product. In aspects, the production schedule and sequence is set by an analysis of the existing production orders and different factors that weigh in producing a specific product (e.g., time involved, materials used, similarity of products, and whether system needs to be cleaned after producing the product). In other aspects, material for each zone is ordered "just in time" for production to occur. This helps to reduce operator mistakes since the wrong material cannot be used in the wrong product.

Advantageously, the present approaches reduce the time to accomplish changeovers. Operator mistakes can also be reduced or eliminated since many or most changes can be automatically accomplished.

In some of these embodiments, a plurality of production orders to produce a plurality of products in a continuous sequence at a production line is accepted. The production line is organized into a plurality of zones. Each of the plurality of products is of a different type. A plurality of production factors associated with the production orders is analyzed to produce an operating schedule for the production line. The operating schedule, when followed at each zone of the production line, is effective to produce the plurality of products in the continuous sequence. Industrial machines in each of the zones are operated according to the schedule.

In aspects, the production factors may include the time involved to produce a product, the materials used to produce the product, a similarity of products, and whether the production line needs to be cleaned after producing the product. Other factors may also affect the production time and are within the scope of the invention.

In other examples, the industrial machines are operated such that materials are applied or are available at each of the zones as the materials are needed at each of the zones. Thus, just-in-time material delivery is utilized and this helps to save costs and increases the efficiency of the production line.

In still other examples, each of the products is separated with a separator as the products are produced on the production line and cross through the different zones. In another example, a counter is used to separate different products as the products are created on the production line. In yet other examples, the order of production of products is changed from an initial schedule to a modified schedule. In still other examples, the production factors may be weighted.

In others of these embodiments, an apparatus (that is configured to operate a production line that has been organized into a plurality of zones), includes an interface and a control circuit.

In such embodiments, the interface includes an input and an output. The input is configured to accept a plurality of production orders that specify the production of a plurality of products in a continuous sequence at the production line. Each of the plurality of products is of a different type.

The control circuit is coupled to the interface and is configured to analyze a plurality of production factors associated with the production orders to produce an operating schedule for the production line. The operating schedule, when followed at each zone of the production line, is effective to produce the plurality of products in the continuous sequence. The control circuit is configured to transmit information via the output. The information is sufficient to operate the industrial machines in each of the zones according to the schedule.

In aspects, the information comprises the schedule, which is rendered on a screen to a user. In other examples, the information comprises a control signal, which is sent to one of the machines.

The production factors can also involve a wide variety of parameters such as the time involved to produce a product, the materials used to produce the product, a similarity of products, or whether the production line needs to be cleaned after producing the product. In examples, materials are applied at each of the zones as the materials are needed at each of the zones. The production factors may also include operator characteristics such as the competence of an operator on a particular machine, operator certifications, scheduled vacation time, and other factors.

In other examples, the control circuit is configured to change the order of production of products from an initial schedule to a modified schedule. In still other aspects, the control circuit is configured to send a signal to order material just-in-time in each of the zones to produce one of the plurality of products. In other examples, each of the production factors may be weighted.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

The present approaches advantageously allow the changeover of products manufactured on a production line to be made seamlessly and without having to wait for the production of a first product to cease before the production of a second product can begin.

The approaches described herein analyze production lines in real-time in order to begin the changeover process from one product to the next, based on the state of the current manufacturing process, the requirements of upcoming products and the customer's delivery schedule. Previously, a manufacturing plant would begin changing all of its lines over only after producing the needed amount of a first product. The approaches described herein allow a partial changeover to begin earlier in the production of the first product based on the speed of production of the first product, and time for changeover (which would be longer in changing from some products to other products).

Advantageously, the present approaches result in more efficient production changeover, meaning less waste of time and materials. Overall delivery schedule can also be examined and changes recommended including (but not limited to) changing the order of production of products. For example, a first schedule may specify producing (in order) shampoo, then mouthwash, and then conditioner. This schedule can be changed to producing shampoo, then conditioner, and then mouthwash if the delivery schedule would allow it. The approaches are dynamically executed, for example, looking at Bill of Materials, which can be examined based on rules associated with constituent materials, production lines, or other factors. The advantages achieved by the novel invention described herein are a result of data analytics capabilities made available with data analytics technologies that were previously unavailable.

Figure 1:
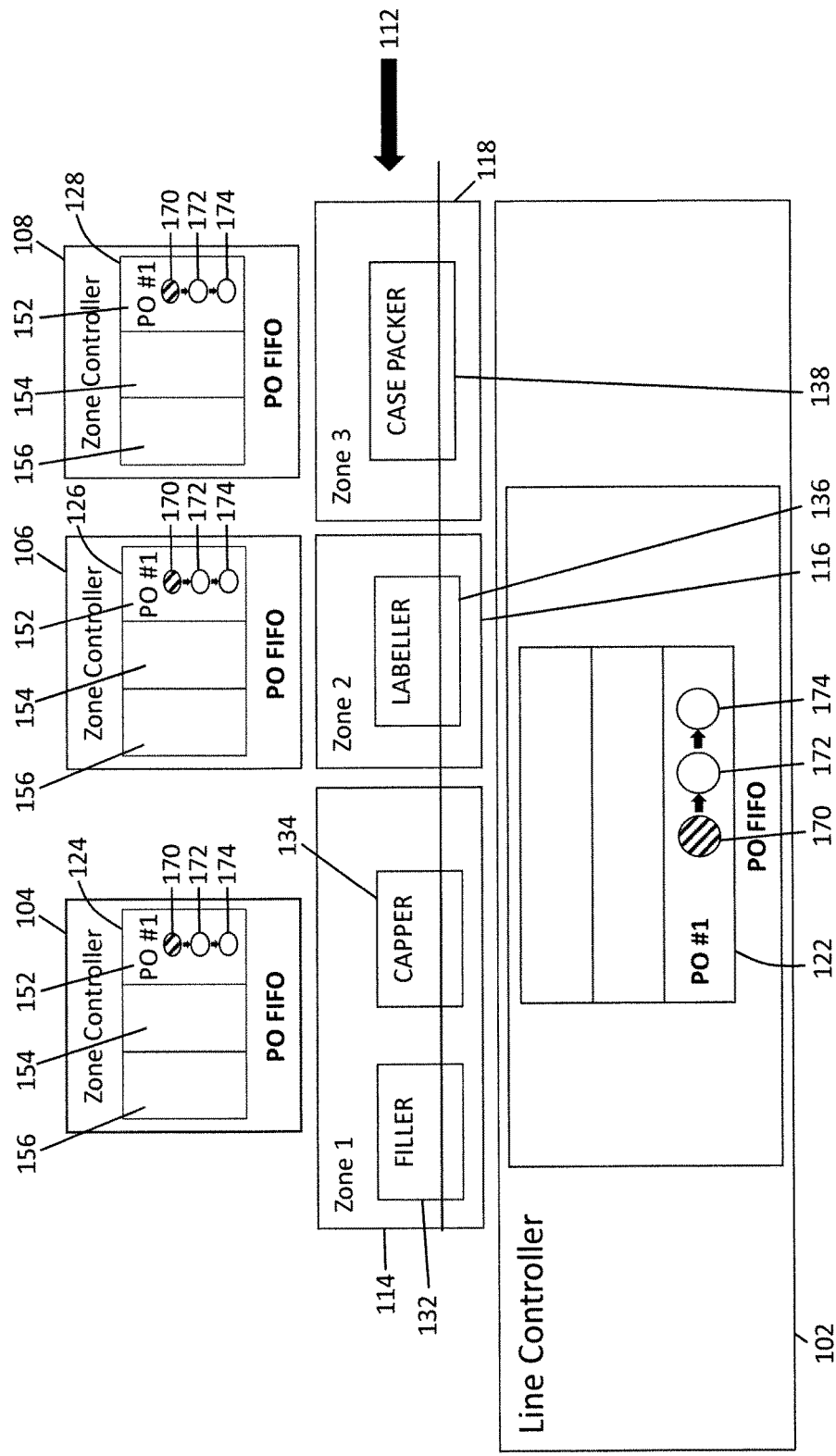
FIG. 1 comprises a block diagram of a system that utilizes dynamic product changeover according to various embodiments of the present invention.

Referring now to FIG. 1, a system 100 that provides for the sequential changeover of orders on a production line is described. The system 100 includes a line control circuit 102 (having a production order (PO) first-in-first out (FIFO) 122), a first zone control circuit 104 (having a PO FIFO 124), a second zone control circuit 106 (having a PO FIFO 126), and a third zone control circuit 108 (having a PO FIFO 128). A production line 112 is divided in a first zone 114, a second zone 116, and a third zone 118.

The first zone 114 includes a filler machine 132 and a capper machine 134. Operational of the first zone is controlled by the first zone control circuit 104. The second zone 116 includes a labeler machine 136. Operation of the second zone is controlled by the second zone control circuit 106. The third zone 118 includes a case picker machine 138. Operation of the third zone is controlled by the third zone control circuit 108.

The FIFOs 122, 124, 126, and 128 are buffers (memories) that include status indicator slots, which indicate the status of a particular purchase order. For example, and for each FIFO, a first slot 152 may indicate the status of a first production order, a second slot 154 may indicate the status of a second production order, a third slot 156 may indicate the status of a third production order, and so forth. The status may be a state. In one example, the state may be an initiated state 170 (the order is started but is not yet active on the line or portion of the line), an active state 172 (the order is moving through the production line or portion of the production line), and a closing state 174 (the order is being closed on the production line or portion of the production line). In the drawings, these states are represented by three circles in a slot. If a particular circle is shaded, then the zone or area is in the state associated with the circle. Each FIFO maintains the state of production orders within its own region of interest. For instance, the FIFO 122 includes the state of orders across the entire line 112, the FIFO 124 includes the state of orders within the first zone 114, and so forth.

The line control circuit 102, first zone control circuit 104, second zone control circuit 104, and third zone control circuit 104 may be any combination of hardware and/or software elements that implement the functions described herein. For example, these circuits may include microprocessors that execute computer instructions stored in a memory.

The line control circuit 102 monitors the production line 112 including all the zones 114, 116, and 118. The line control circuit 102 may send instructions to control the operation of the different zones and the machines in these zones. For example, the line control circuit 102 may receive production orders and send instructions to the control circuits 104, 106, and 108 in the zones 114, 116, and 118. The control circuits 104, 106, and 108 may then operate the machines in the zones.

The first zone control circuit 104, second zone control circuit 106, and third zone control circuit 108 control the operation of the machines in their zone. In aspects, the first zone control circuit 104, second zone control circuit 106, and third zone control circuit 108 receive instructions from the line control circuit 102 and operate the machines in their zone according to these instructions. In other examples, control circuits 104, 106, and 108 have greater autonomy and operate aspects of production in their zones without interaction of the line control circuit 102.

The various machines within the zones are examples only and can be changed based upon the needs of a particular user, system, or production line. The filler machine 132 fills bottles. The capper machine 134 places caps on the bottles. The labeler machine 136 places labels on the bottles. The case picker machine 138 selects a case to store or ship the bottles.

Again, these machines are examples only, and the number and types of machines in a zone, and the number of zones may vary.

As products are manufactured, they pass through the line. A count may be kept at the line or zone control circuits to separate products and determine when a zone changes from producing one product to producing another product. For instance, if it is known that 10,000 mouthwash products are to be made, a mouthwash counter increments each time one mouthwash product passes or is acted upon by a machine or zone. Once the count of 10,000 is reached, it is known that the next product type is coming through that point in the line. In other examples, a physical separator (e.g., an RFID tag) may be used to separate products on the line as they move from zone to zone or from machine to machine. A detector or sensor may be used to physically sense when one product ends (on the line) and the next product begins (on the line). In this way, an event of a new product arriving at a zone is detected.

Figure 2:
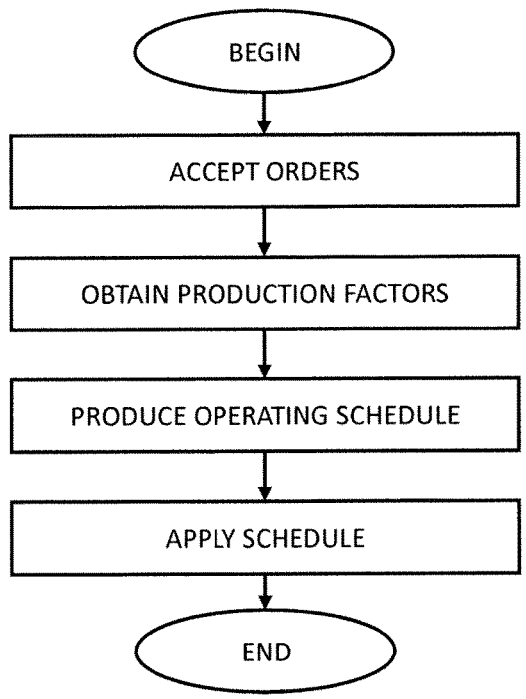
FIG. 2 comprises a flow chart of one approach for dynamic product changeover according to various embodiments of the present invention.

Referring now to FIG. 2, one approach for dynamic changeover is described. In this example, a production line is organized into a plurality of zones, such as that shown in FIG. 1.

At step 202, a plurality of production orders to produce a plurality of products in a continuous sequence at a production line is accepted. Each of the plurality of products is of a different type.

At step 204, production factors are accepted or obtained. In aspects, the production factors may be stored in a database. In other examples, a production order may be analyzed to determine some of the factors. In other examples, the factors are entered by a human. In aspects, the production factors include the time involved to produce a product, the materials used to produce the product, a similarity of products, and whether the production line needs to be cleaned after producing the product. Other examples are possible.

At step 206, the production factors associated with the production orders is analyzed to produce an operating schedule for the production line. The operating schedule, when followed at each zone of the production line, is effective to produce the plurality of products in the continuous sequence. Industrial machines in each of the zones are operated according to the schedule.

In other examples, the industrial machines are operated such that materials are applied, or are available at each of the zones as the materials are needed at each of the zones. Thus, just-in-time material delivery is utilized and this approach helps to save costs and increases the efficiency of the production line.

In still other aspects, each of the products is separated with a separator as the products are produced and cross through the different zones. In another example, a counter is used to separate different products as the products are created on the production line. In yet other examples, the order of production of products is changed from an initial schedule to a modified schedule. In still other examples, the production factors may be weighted.

Figure 3:
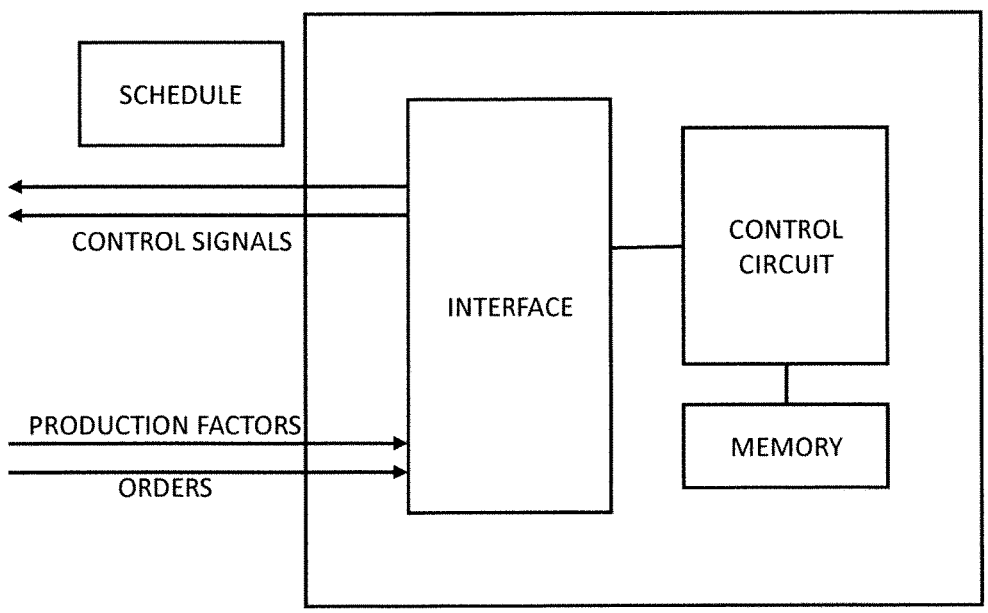
FIG. 3 comprises a block diagram of an apparatus that implements dynamic product changeover according to various embodiments of the present invention.

Referring now to FIG. 3, an apparatus 300 (that is configured to operate a production line that has been organized into a plurality of zones), includes an interface 302 and a control circuit 304.

The interface 302 includes an input 306 and an output 308. The input 306 is configured to accept a plurality of production orders 310 that together specify the production of a plurality of products in a continuous sequence at the production line. Each of the plurality of products is of a different type.

The control circuit 304 is coupled to the interface 302 and is configured to analyze a plurality of production factors 312 associated with the production orders 310 to produce an operating schedule 314 for the production line. The operating schedule 314, when followed at each zone of the production line, is effective to produce the plurality of products in the continuous sequence. The control circuit 304 is configured to transmit information 316 via the output. The information 316 is sufficient to operate the industrial machines in each of the zones according to the schedule 314.

In aspects, the information 316 comprises the schedule 314, which is rendered on a screen to a user. In other examples, the information comprises a control signal (or multiple control signals), which is sent to one or more of the machines.

The production factors relate to a wide variety of parameters such as the time involved to produce a product, the materials used to produce the product, a similarity of products, or whether the production line needs to be cleaned after producing the product. In examples, materials are applied at each of the zones as the materials are needed at each of the zones.

In other examples, the control circuit 304 is configured to change the order of production of products from an initial schedule to a modified schedule. In other aspects, the control circuit 304 is configured to send a signal to order material just-in-time in each of the zones to product one of the plurality of products. In other examples, each of the production factors may be weighted.

Figure 4A:
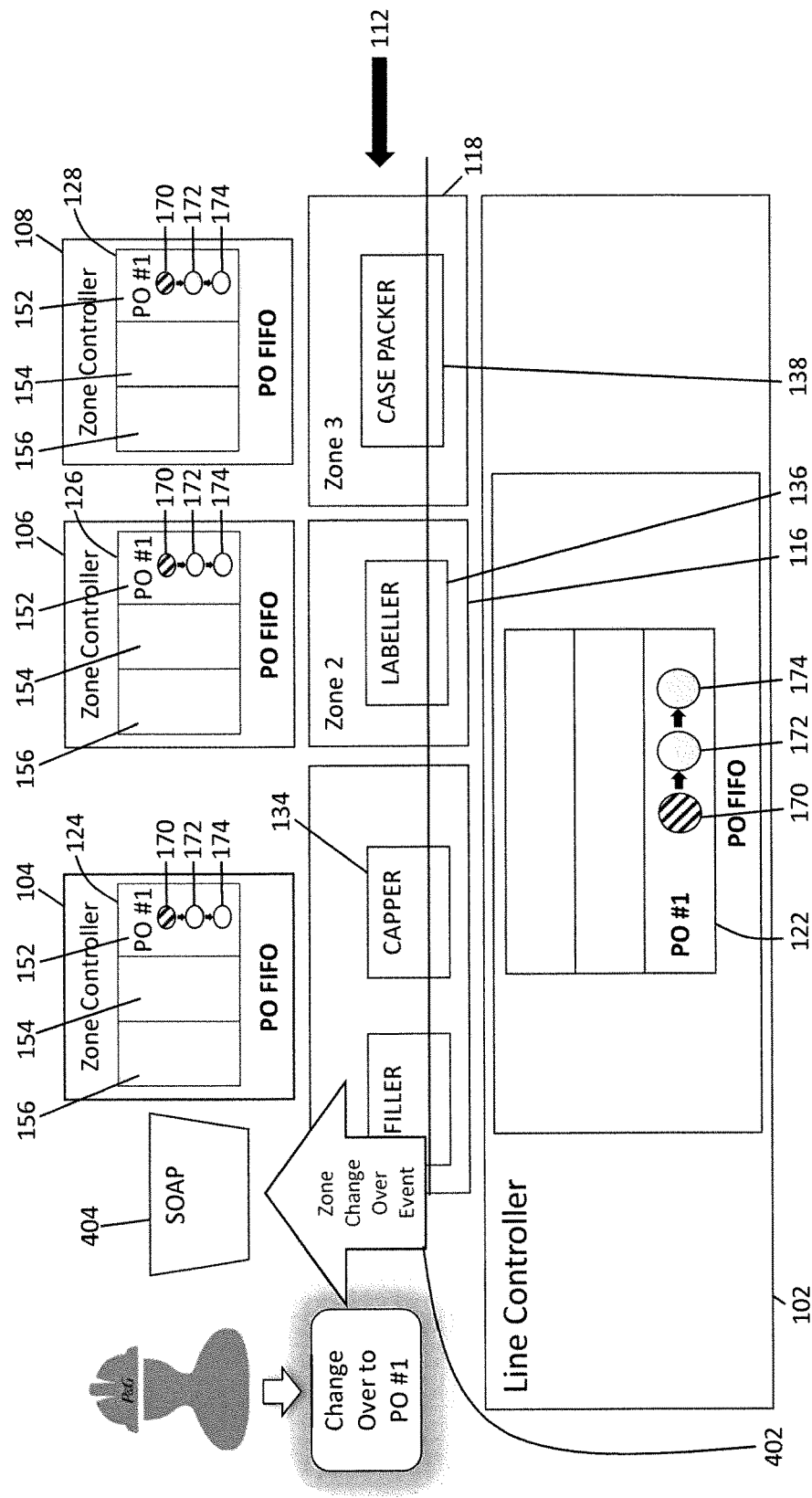
FIG. 4A-4O comprise block diagrams showing a production line in various stages of the changeover process according to various embodiments of the present invention.

Referring now to FIGS. 4A-4O, one example of how the production line 112 of FIG. 1 operates is described. For simplicity, the same reference numerals of FIG. 1 are used in these figures.

FIG. 4A shows the production line 112 in an initial state, when an event 402 occurs. The event 402 indicates a changeover to purchase order 1 and may be started by receipt of purchase order 1, or some other occurrence (e.g., arrival of soap 404).

Figure 4B:
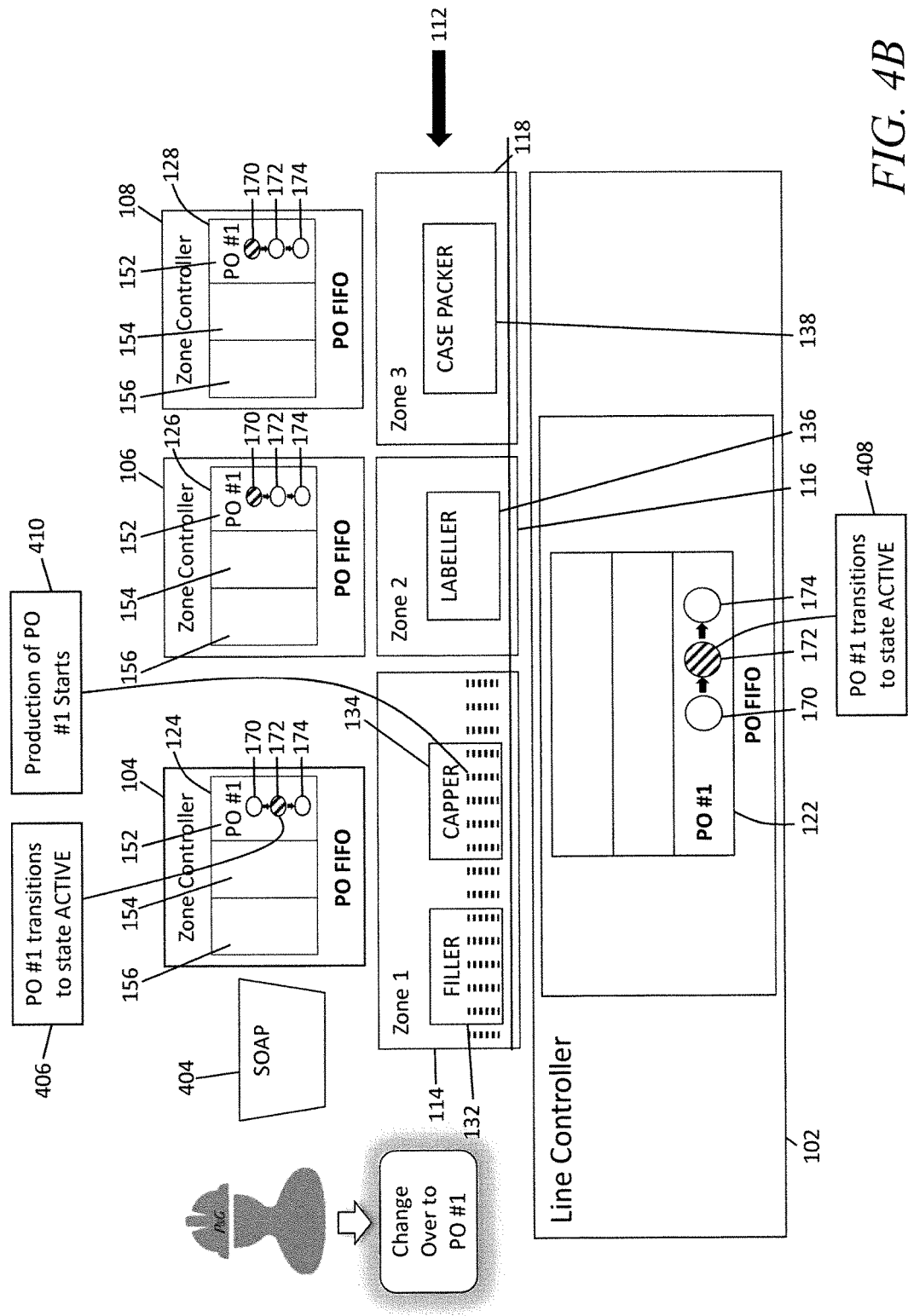

FIG. 4B shows the changes to the state indicators in the FIFOs 122, 124, 126, and 128 after the event of FIG. 4A occurs. At step 406, the first slot 152 for the FIFO 124 first zone control circuit 104 shows that the state for purchase order 1 is "active" At step 408, the slot 152 in FIFO 122 the line control circuit 102 transitions to show "active." At step 410, the production of the product identified by purchase order 1 starts. This first product is shown in a first shading in the drawings.

Figure 4C:
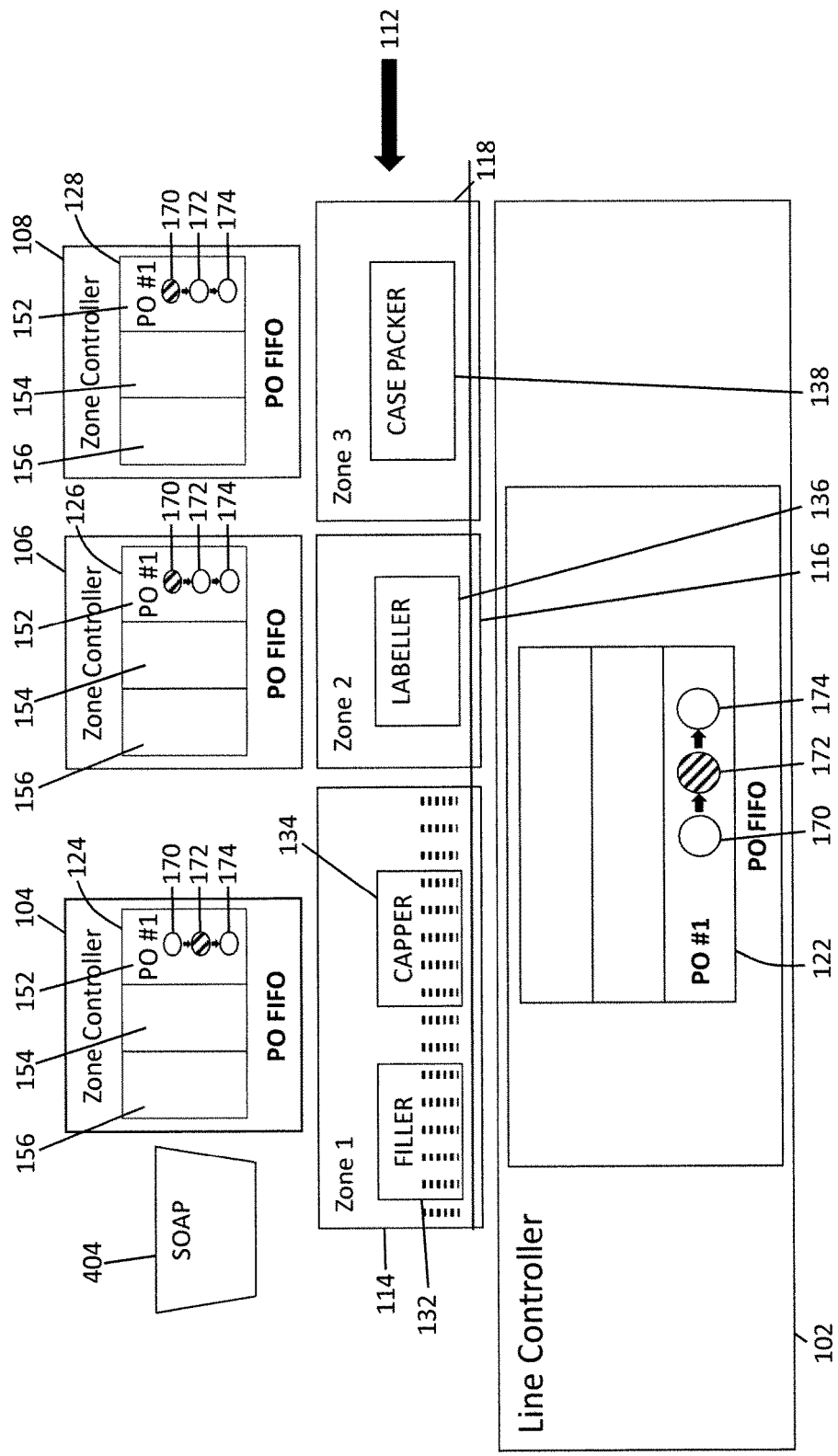

FIG. 4C shows the continuing production of the product in the purchase order. The states in the various product slots 152, 154, and 156 in each of the FIFOs 122, 124, 126, and 128 stay the same.

Figure 4D:
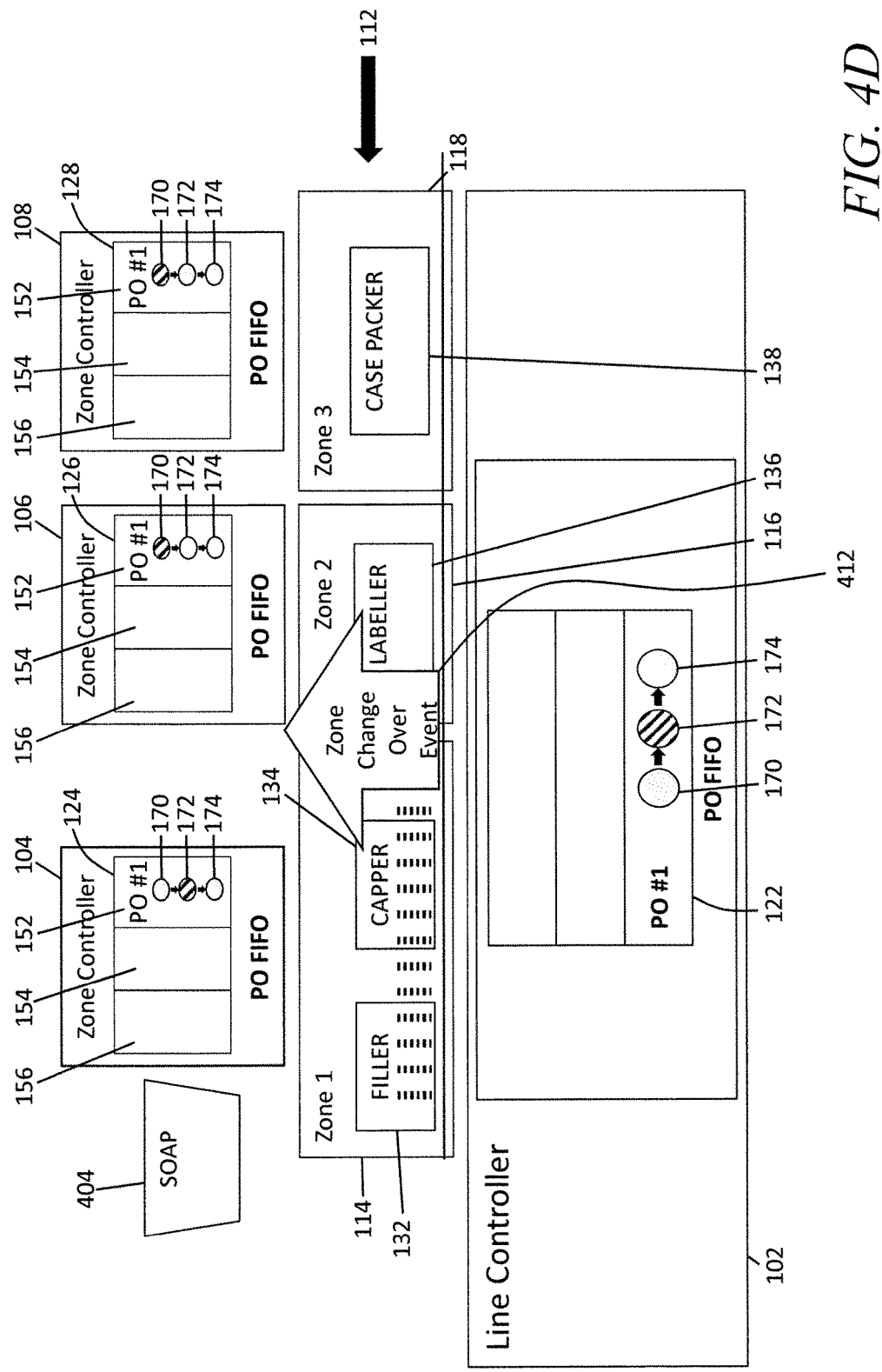

FIG. 4D shows the occurrence of another zone changeover event 412. In this case, the product that is being manufactured in the first zone reaches the second zone.

Figure 4E:
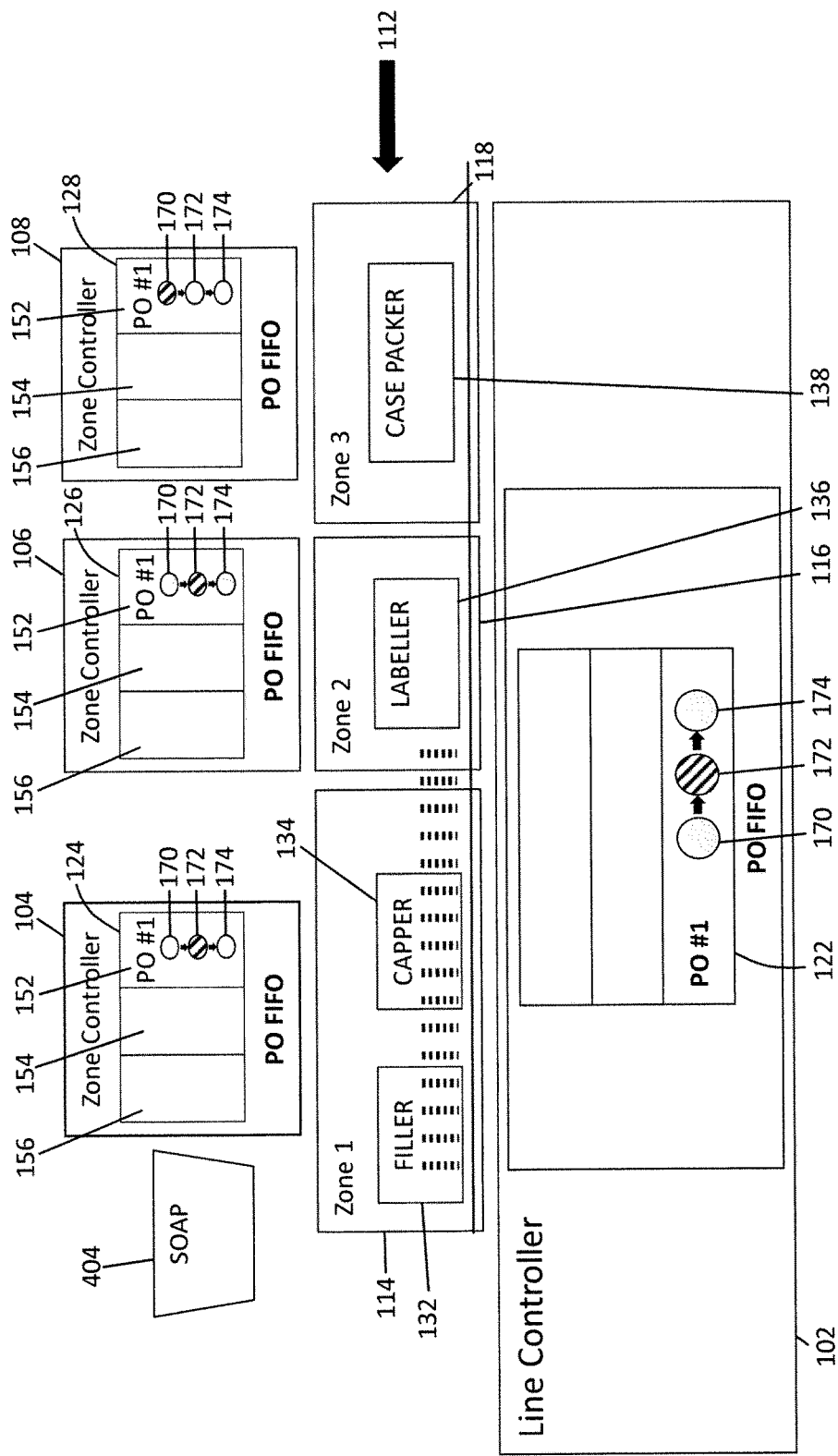

FIG. 4E shows the result of the zone changeover event 412. The first slot 152 in the second zone controller FIFO 126 now changes to show "active." All other states in all other slots remain the same.

Figure 4F:
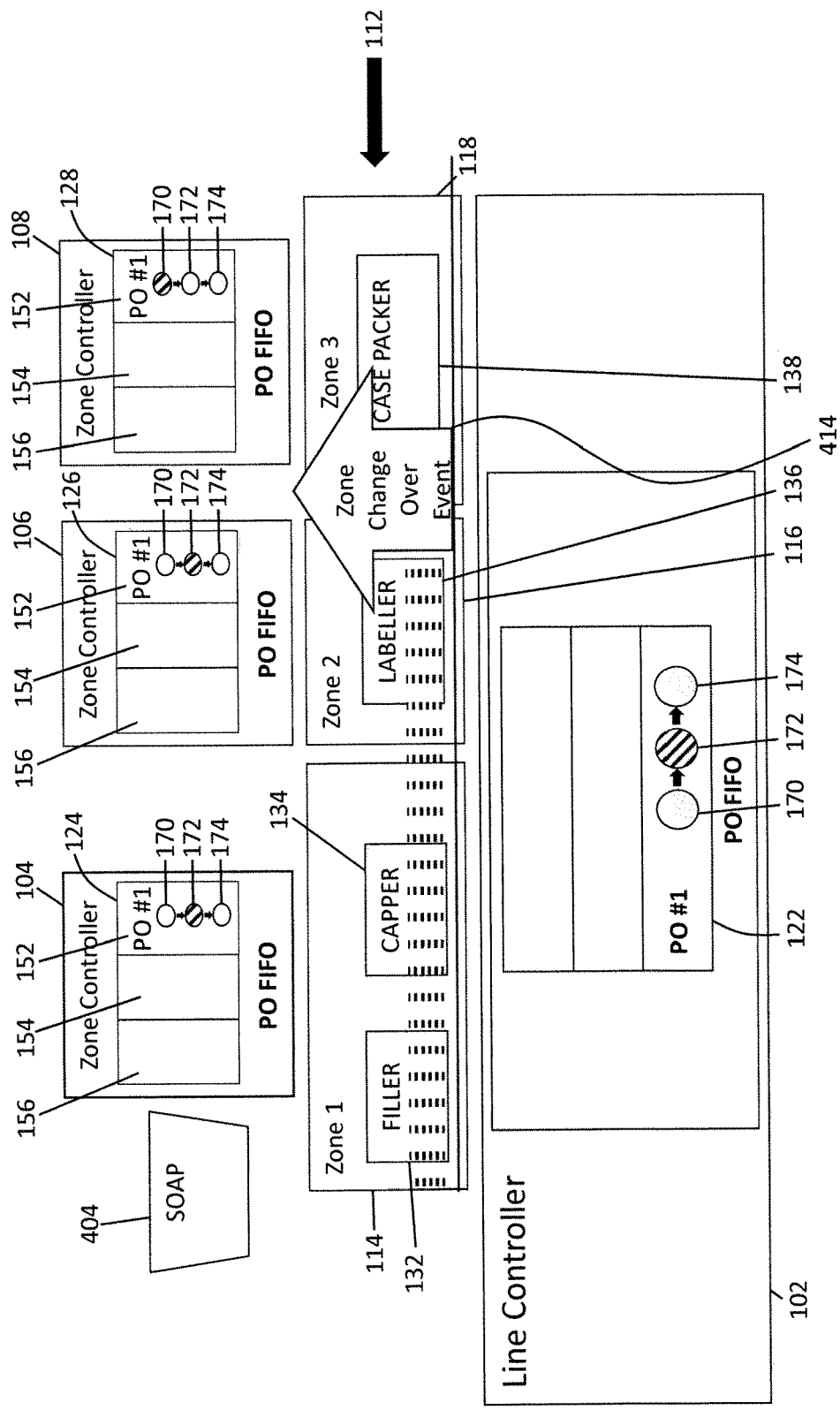

FIG. 4F shows the occurrence of another zone changeover event 414. In this case, the product that is being manufactured in the second zone reaches the third zone.

Figure 4G:
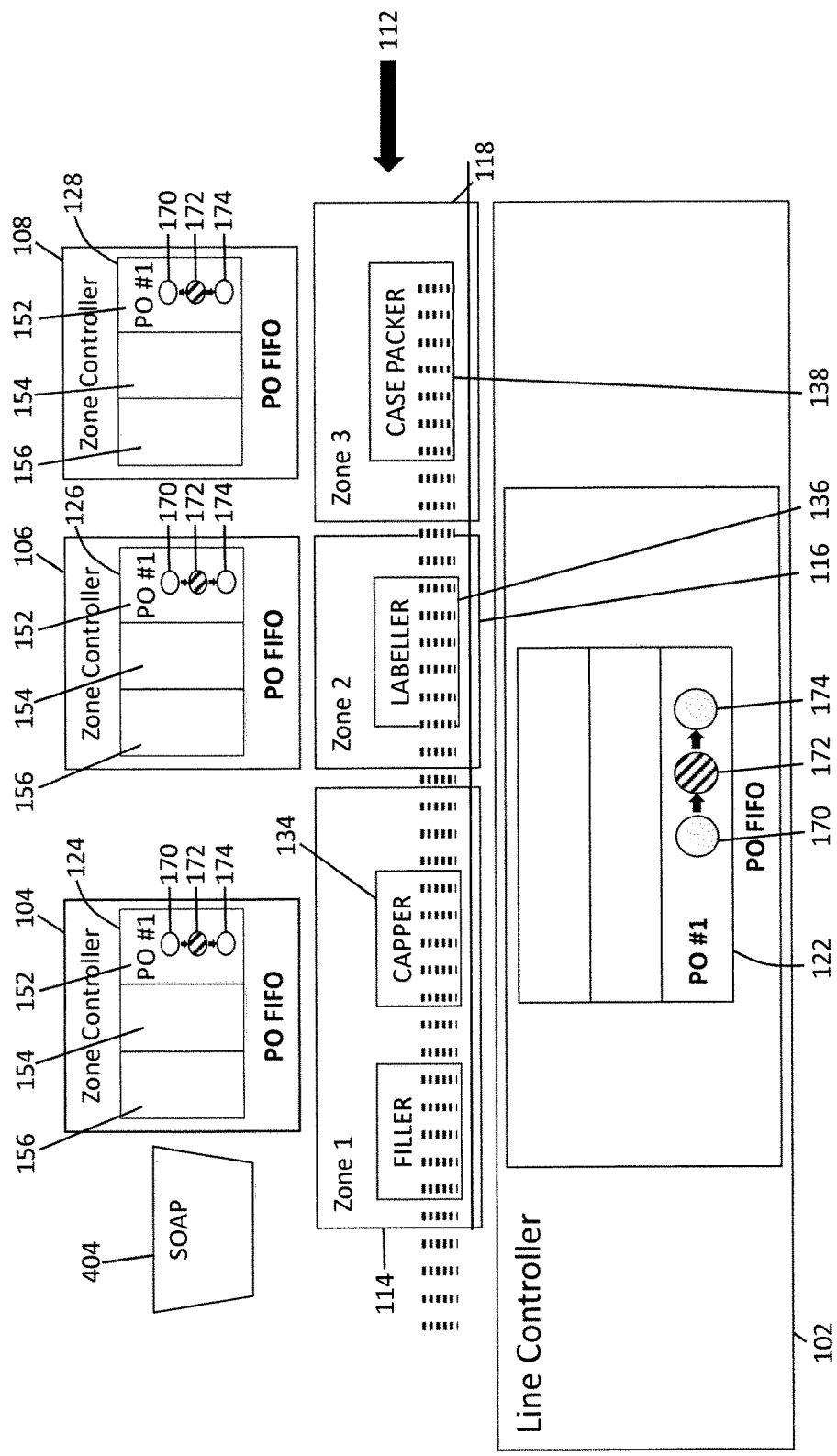

FIG. 4G shows the result of the zone changeover event 414. The first slot 152 in the third zone controller FIFO 128 now changes to show "active." All other states shown in all other slots remain the same.

Figure 4H:
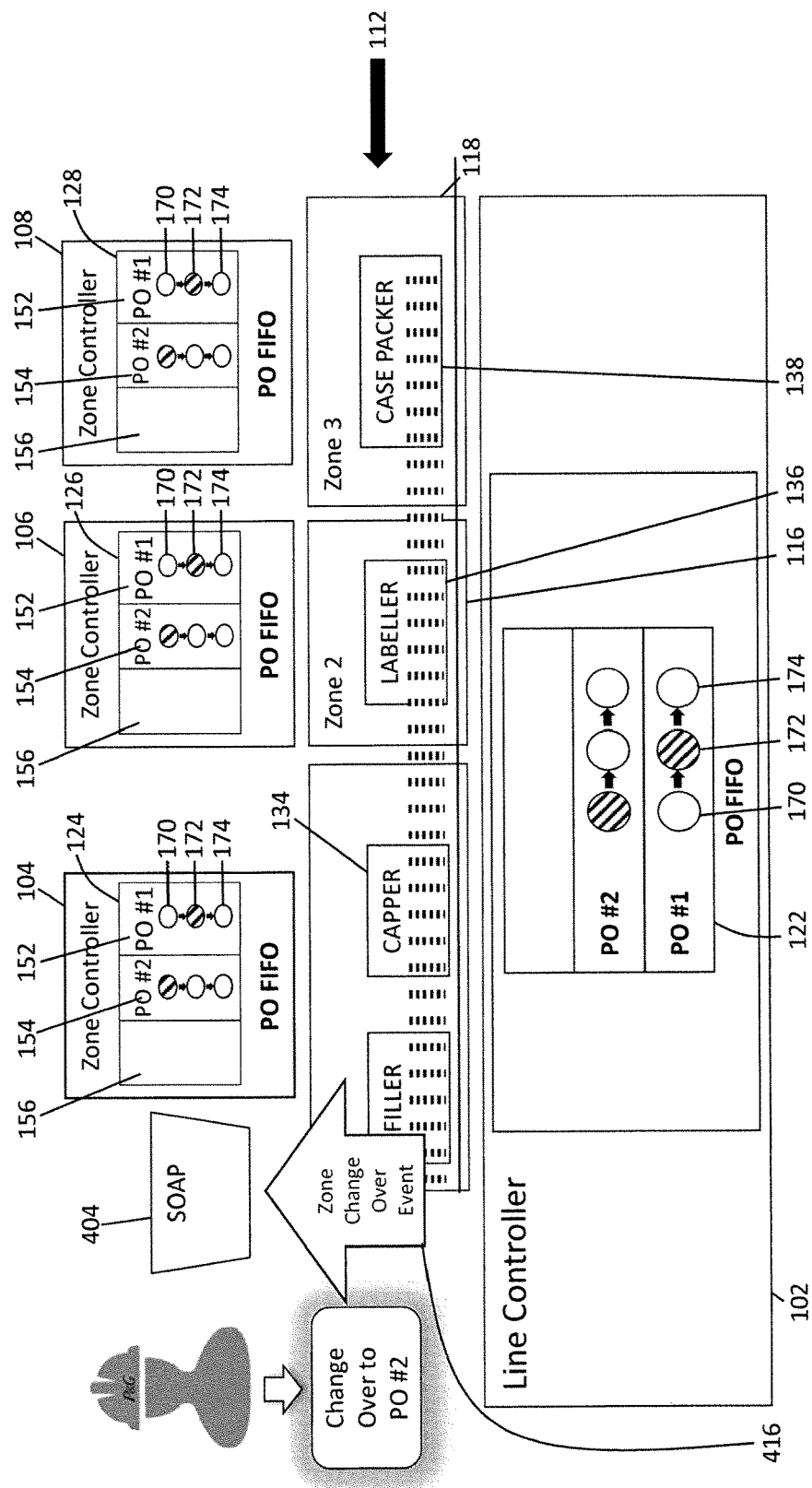

FIG. 4H shows the occurrence of another changeover event 416. The event 416 is the arrival of a production order 2 into the production line 112.

Figure 4I:
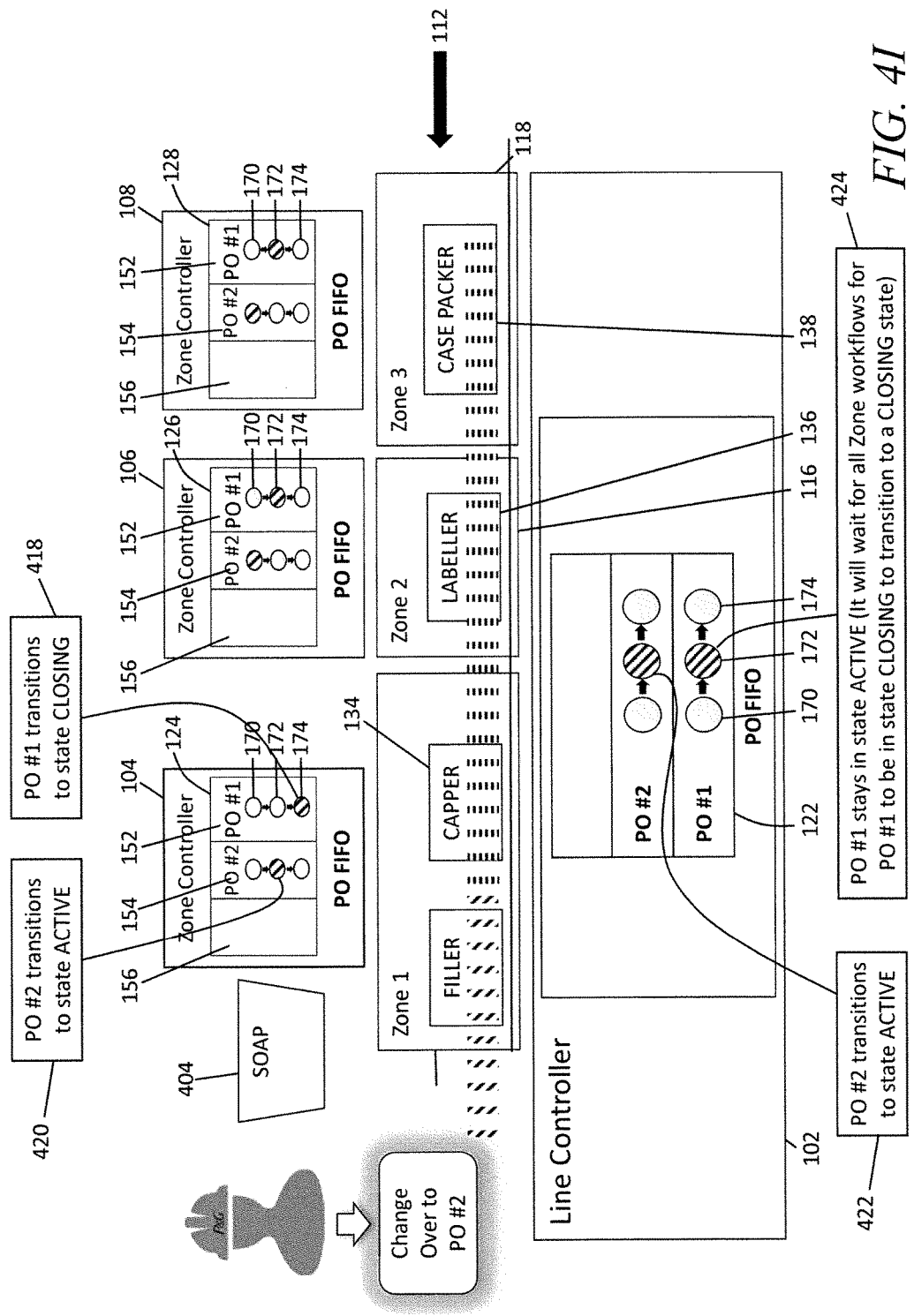

FIG. 4I shows the result of the event 416. In the FIFO 124 of the first zone control circuit 104, step 418 shows the state of purchase order 1 transition to "closing." Step 420 shows the state of purchase order 2 transitioning to "active" in the second slot 154 of FIFO 124. Step 422, shows purchase order 2 transitioning to active in the second slot of the FIFO 122 of the line control circuit 102. Step 424 shows that purchase order 1 is still shown as active in the first slot 152 of the line control circuit 102.

Figure 4J:
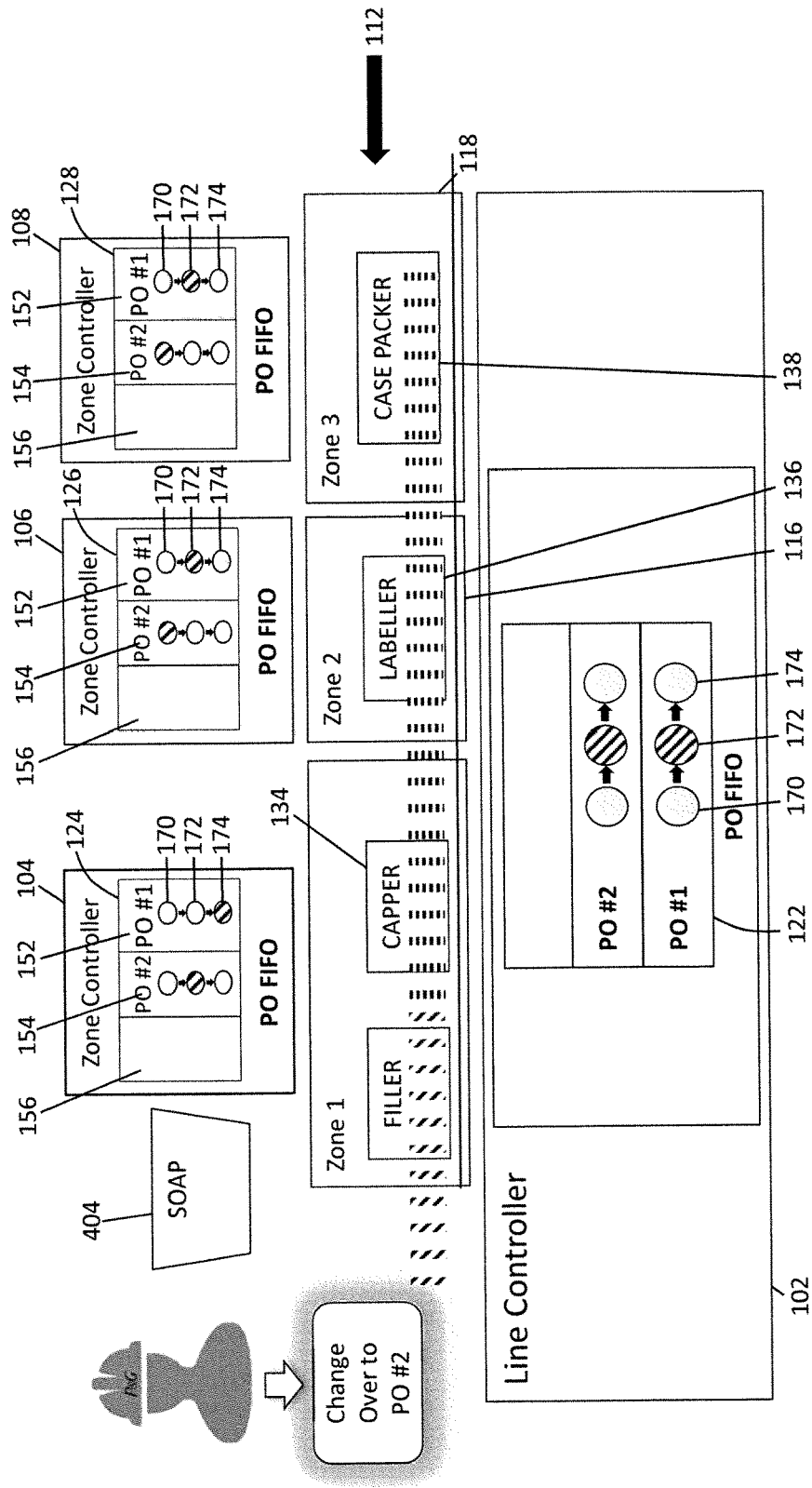

FIG. 4J shows the start of production of the second product of purchase order 2. This second product is shown in a second shading in the drawings.

Figure 4K:
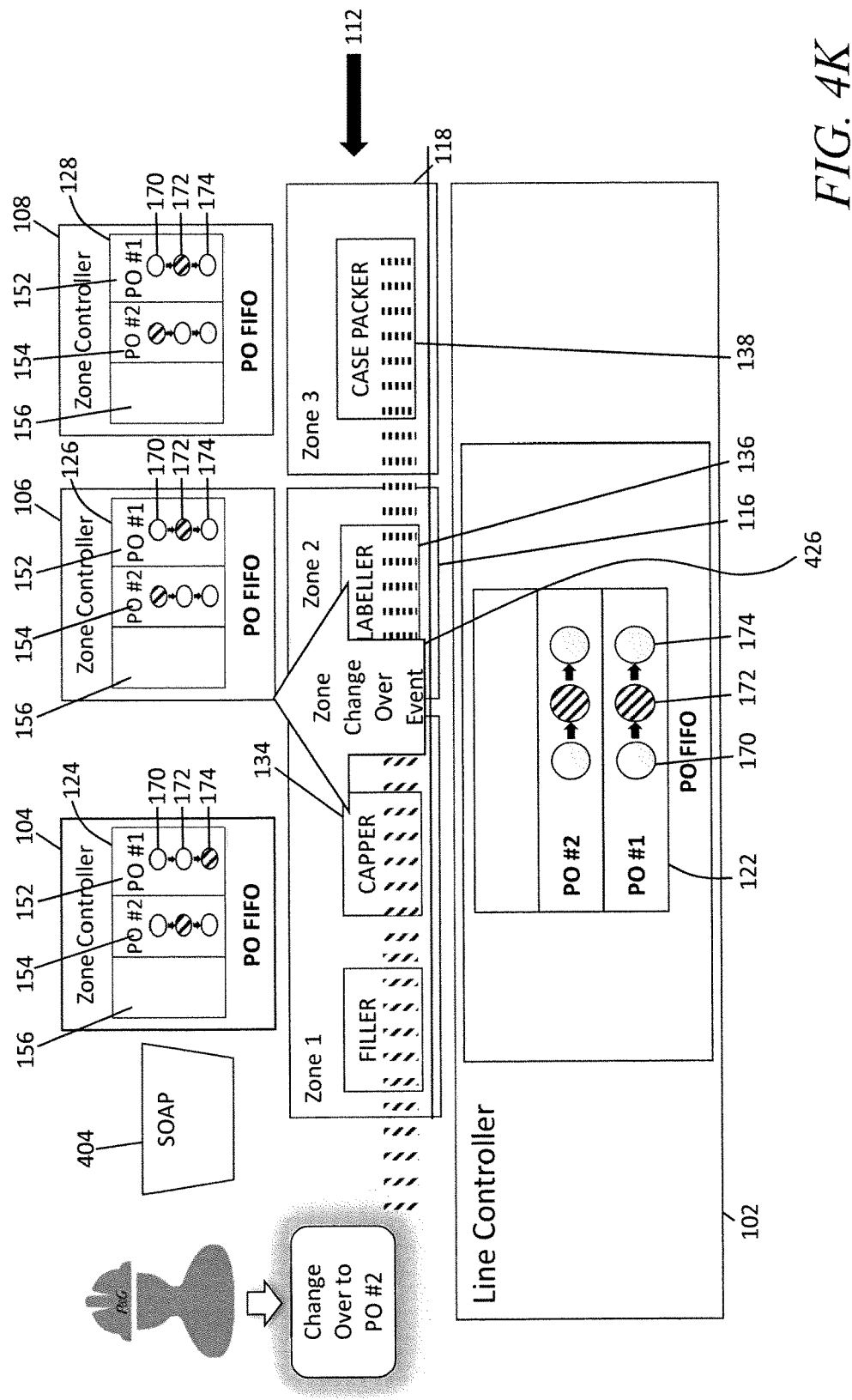

FIG. 4K shows the occurrence of a changeover event 426. This event occurs when the product of production order 2 reaches the second zone 116.

Figure 4L:
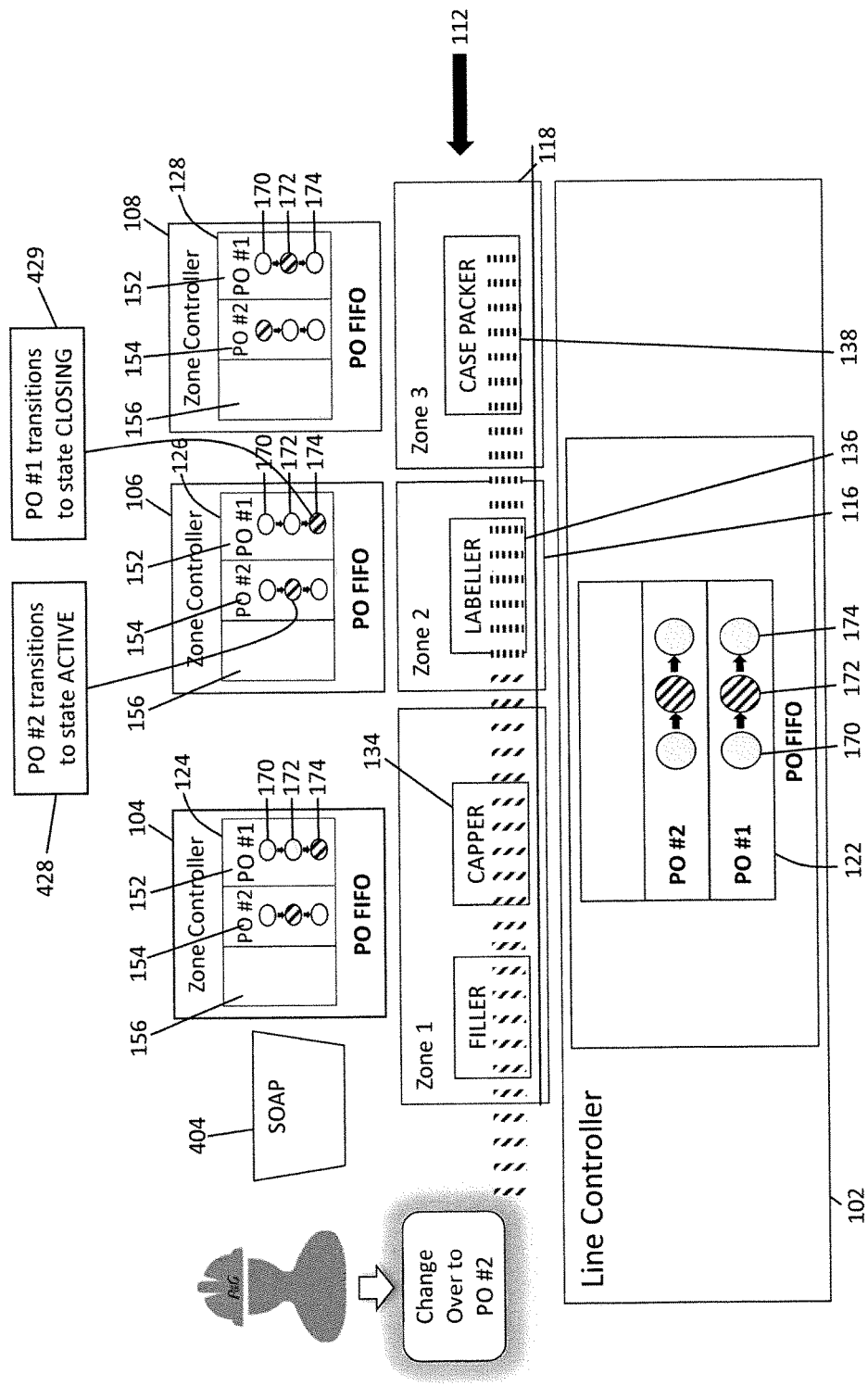

FIG. 4L shows the results of the event 426. At step 428, the second slot 154 of the second zone controller transitions to show active. At step 429, the first slot 152 of the second zone control circuit 106 FIFO 126 transitions to "closing."

Figure 4M:
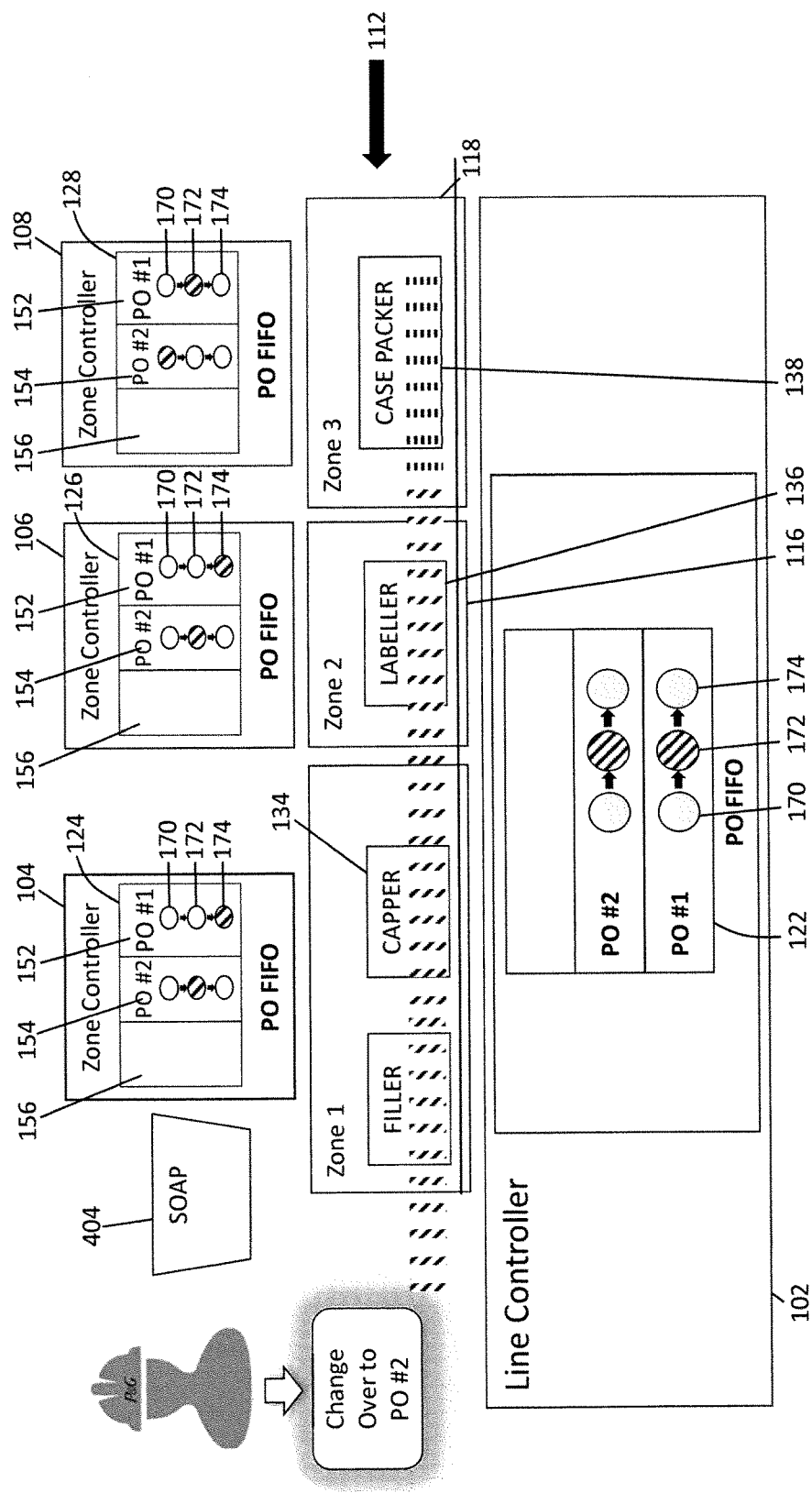

FIG. 4M shows the continued production of the product of the second purchase order.

Figure 4N:
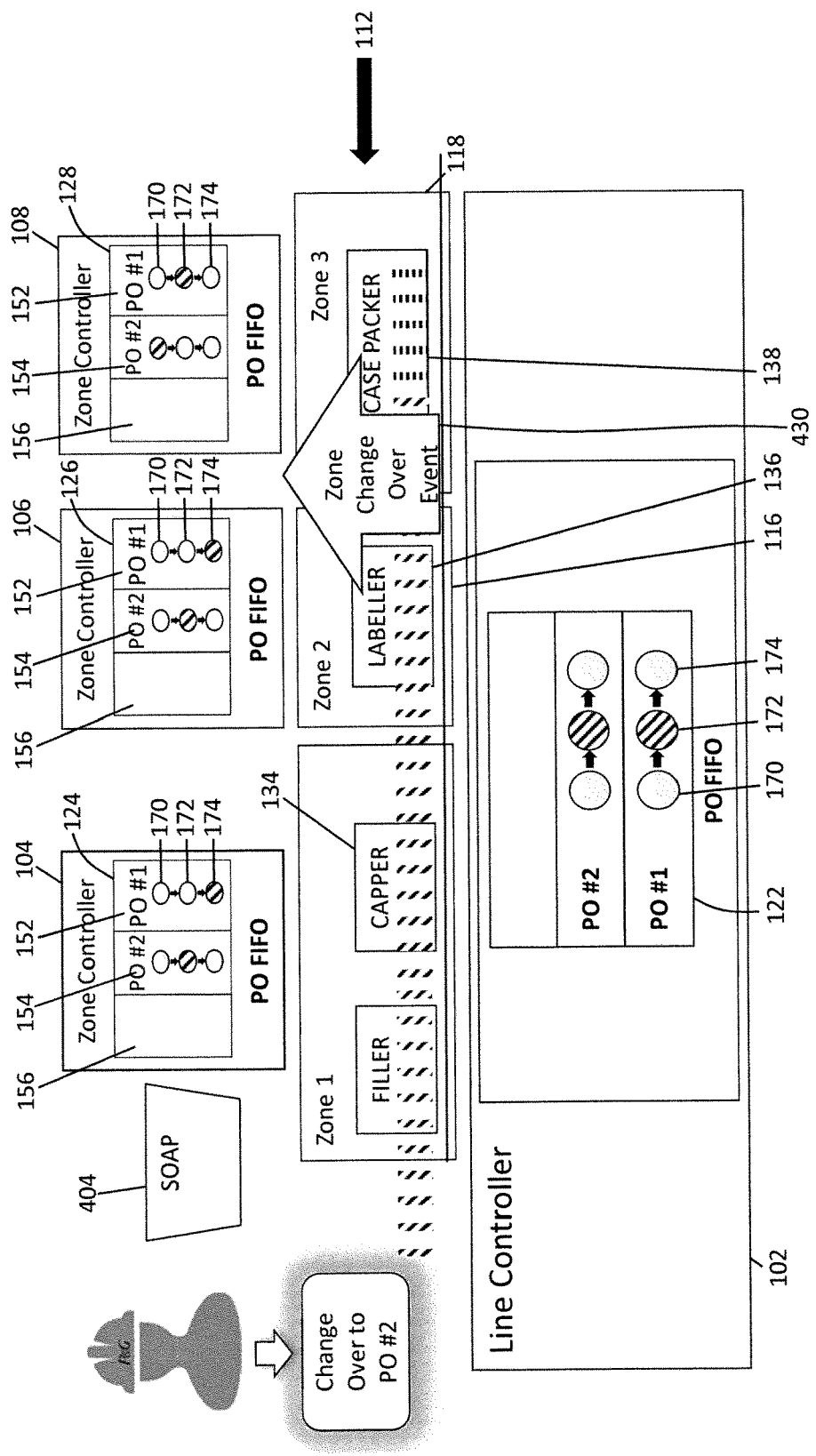
Figure 40:
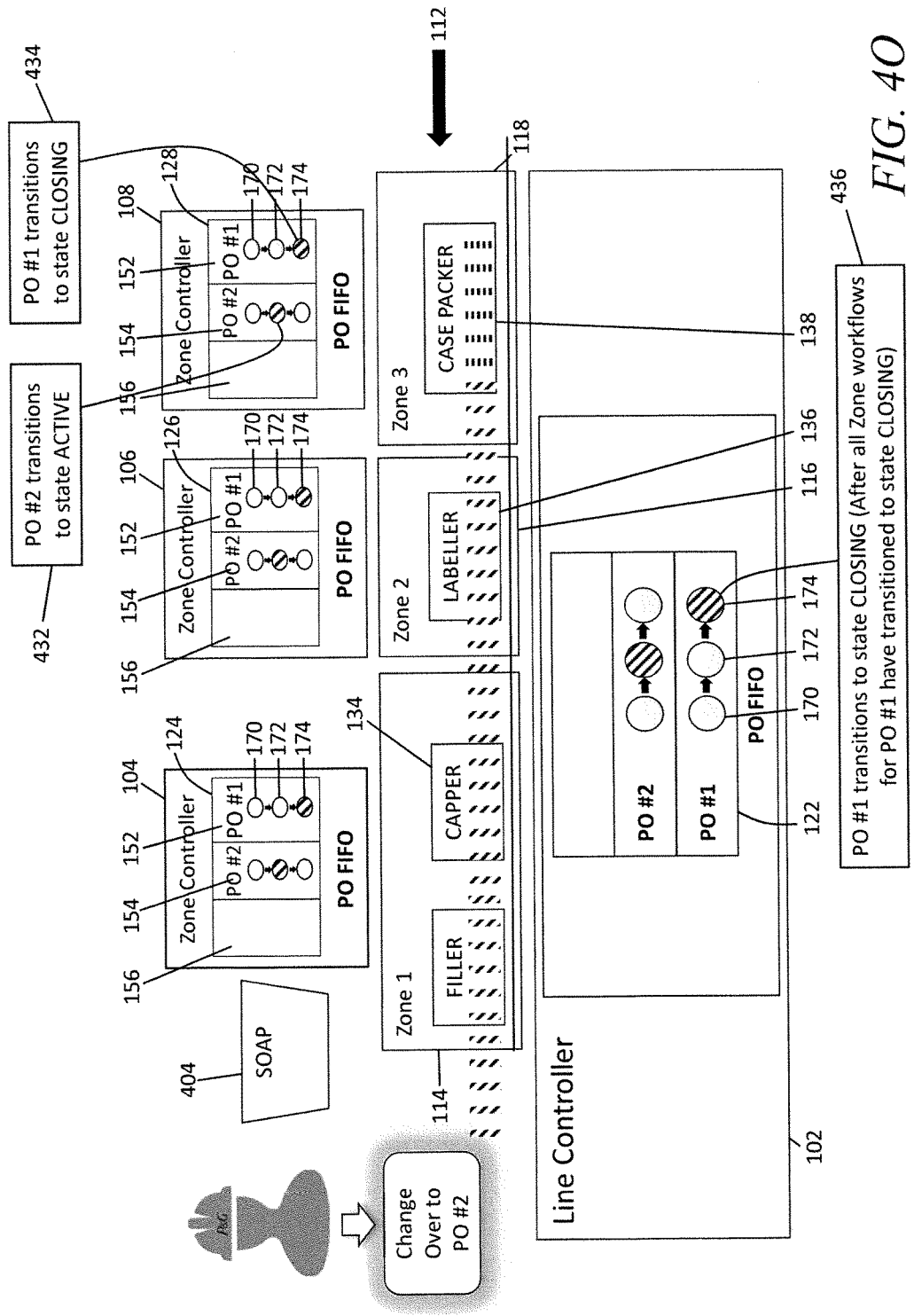

FIG. 4N shows a changeover event 430. The event 430 is when the second product reaches the third zone 118.

FIG. 4O shows what happens after the occurrence of the event 430. At step 432, the second slot 154 in the third zone control circuit 108 FIFO transitions to "active." At step 434, the first slot 152 in the third zone controller FIFO 125 transitions to "closing." At step 436, the first slot 152 in the line controller FIFO 122 transitions to "closing."

Figure 5:
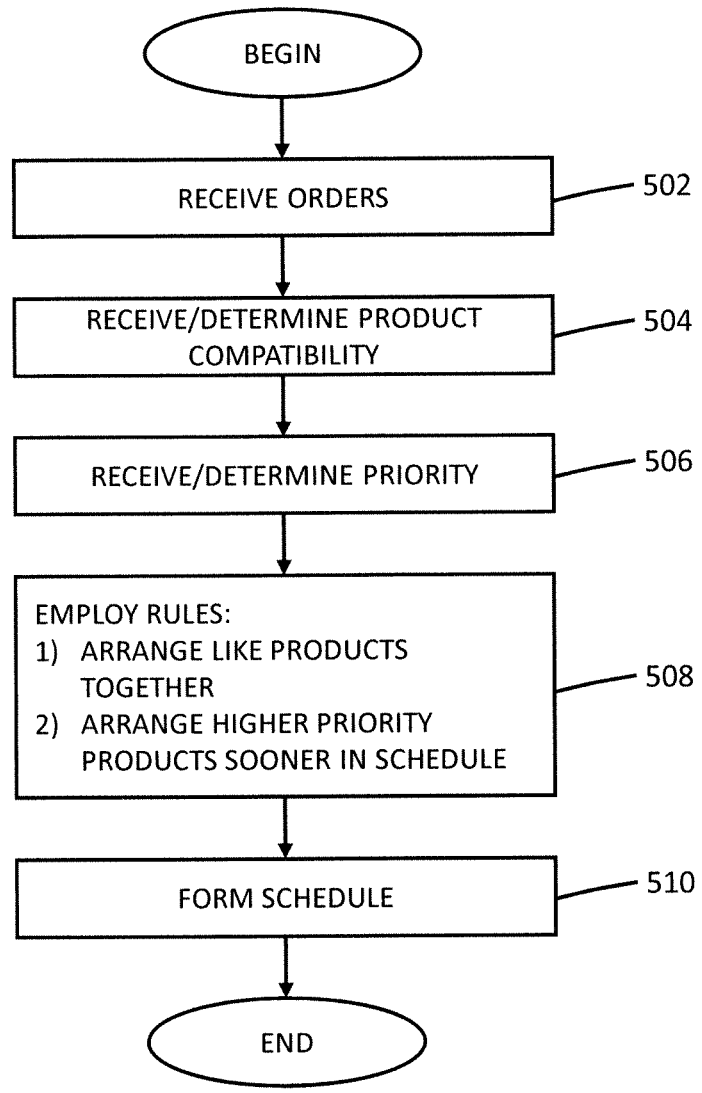
FIG. 5 comprises a flowchart of one example of determining a schedule according to various embodiments of the present invention.

Referring now to FIG. 5, one example of determining a production line schedule is described. It will be appreciated that this is one example only, and that other examples are possible.

At step 502, production orders are received. The orders specify a product and in some aspects include only a single product. In other examples, a single order is received but is divided into or includes multiple products.

At step 504, product compatibility (e.g., a production factor) for the products in the orders is determined. Compatibility may relate to the changes to a machine required to produce products. For instance, shampoo and hair conditioner may be seen as compatible, while shampoo and mouthwash may be seen as not compatible. In the first case, the machine(s) do not need to be cleaned when switching production between these two products since neither shampoo nor conditioner are consumed by humans. In the second case, the shampoo and mouthwash may be seen as not compatible, since the machine used to manufacture both needs to be cleaned (since mouthwash is placed in the mouth of a human) when production is shifted from shampoo to mouthwash.

At step 506, the priority of products (another production factor) is determined. In one example, priority may be indicated in the orders. In other examples, the priority may be pre-stored or set.

At step 508, different rules are used to create the schedule. In this example, a first rule arranges compatible or like-products together. A second rule schedules higher priority products sooner or earlier (e.g., before lower priority products).

At step 510, a schedule is formed based upon the rules of step 528. In the example discussed here, like-products (shampoo and conditioner) are grouped and mouthwash is placed in a separate group. Then, the priority of products is considered. For example, mouthwash may be higher priority, so it is placed in the sequence before shampoo and conditioner. Thus, one schedule would manufacture X units of mouthwash, followed by Y units of shampoo (assuming shampoo was higher priority than conditioner), followed by Z units of conditioner.

It will be appreciated that the various factors can be weighted in different ways. For example, priority may be weighted higher than product compatibility. Also, other factors including operator availability, machine availability, and material availability, to mention a few examples may all be considered.

Once the schedule is determined, various actions can occur. These may include presenting the schedule to a user so that the user may implement the schedule. Materials may be ordered for the sequence and may arrive just-in-time for manufacturing of a product. For instance, if mouthwash is to be made on Monday, the materials used for it are ordered to arrive on Monday, just-in-time for the mouthwash to be manufactured.

It will be appreciated by those skilled in the art that modifications to the foregoing embodiments may be made in various aspects. Other variations clearly would also work, and are within the scope and spirit of the invention. It is deemed that the spirit and scope of that invention encompasses such modifications and alterations to the embodiments herein as would be apparent to one of ordinary skill in the art and familiar with the teachings of the present application.

What is claimed is:

1. A method of producing products on a production line that has been organized into a plurality of zones, the method comprising:

accepting a plurality of production orders to produce a plurality of products in a continuous sequence at a production line, each of the plurality of products being of a different type;

wherein the production line is arranged into a first zone including a first industrial machine, and a second zone including a second industrial machine;

analyzing a plurality of production factors associated with the production orders to produce an operating schedule for the production line, the operating schedule when followed at each zone of the production line being effective to produce the plurality of products in the continuous sequence;

operating industrial machines in each of the zones according to the schedule;

wherein, according to the operating schedule, the first industrial machine performs a first manufacturing action in the production of a first product and the second industrial machine subsequently performs a second manufacturing action in the production of the first product, the first manufacturing action being different from the second manufacturing action;

wherein the first industrial machine or the second industrial machine use a first material to produce the first product and the first material is delivered to the first industrial machine or the second industrial machine just as the first material is needed;

wherein, according to the operating schedule and after the first product has been produced, the first industrial machine performs a third manufacturing action in the production of a second product and the second industrial machine subsequently performs a fourth manufacturing action in the production of the second product, the third manufacturing action being different from the fourth manufacturing action;

wherein the first product is of a different type from the second product;

wherein the first industrial machine or the second industrial machine use a second material to produce the second product and the second material is delivered to the first industrial machine or the second industrial machine just as the second material is needed;

wherein at some point in time, the first product is being produced by the second machine and the second product is being produced by the first machine so that production of products from the first machine to the second machine is serial and continuous.

2. The method of claim 1, wherein the production factors are selected from the group consisting of the time involved to produce a product, the materials used to produce the product, a similarity of products, and whether the production line needs to be cleaned after producing the product.

3. The method of claim 1, further comprising separating each of the products with a separator as the products are produced.

4. The method of claim 1, further comprising changing the order of production of products from an initial schedule to a modified schedule.

5. The method of claim 1, wherein each of the production factors are weighted.

6. The method of claim 1, wherein a counter is used to separate different products as the products are created on the production line.

7. An apparatus that is configured to operate a production line that has been organized into a plurality of zones, the apparatus comprising:

an interface that includes an input and an output, the input configured to accept one or more production orders that specify the production of one or more products in a continuous sequence at the production line, at least one of the products being of a different type;

wherein the production line is arranged into a first zone including a first industrial machine, and a second zone including a second industrial machine;

a control circuit, the control circuit coupled to the interface and configured to analyze one or more production factors associated with the one or more production orders to produce an operating schedule for one or more zones on the production line, the operating schedule being effective to produce the plurality of products in the continuous sequence, the control circuit configured to transmit information via the output, the information being sufficient to operate the industrial machines in each of the zones according to the schedule;

wherein, according to the operating schedule, the first industrial machine performs a first manufacturing action in the production of a first product and the second industrial machine subsequently performs a second manufacturing action in the production of the first product, the first manufacturing action being different from the second manufacturing action;

wherein the first industrial machine or the second industrial machine use a first material to produce the first product and the first material is delivered to the first industrial machine or the second industrial machine just as the first material is needed;

wherein, according to the operating schedule and after the first product has been produced, the first industrial machine performs a third manufacturing action in the production of a second product and the second industrial machine subsequently performs a fourth manufacturing action in the production of the second product, the third manufacturing action being different from the fourth manufacturing action;

wherein the first product is of a different type from the second product;

wherein the first industrial machine or the second industrial machine use a second material to produce the second product and the second material is delivered to the first industrial machine or the second industrial machine just as the second material is needed;

wherein at some point in time, the first product is being produced by the second machine and the second product is being produced by the first machine so that production of products from the first machine to the second machine is serial and continuous.

8. The apparatus of claim 7, wherein the information comprises the schedule, which is rendered on a screen to a user.

9. The apparatus of claim 7, wherein the information comprises a control signal, which is sent to one of the machines.

10. The apparatus of claim 7, wherein the production factors are selected from the group consisting of the time involved to produce a product, the materials used to produce the product, a similarity of products, and whether the production line needs to be cleaned after producing the product.

11. The apparatus of claim 7, wherein the control circuit is configured to change the order of production of products from an initial schedule to a modified schedule.

12. The apparatus of claim 7, wherein each of the production factors are weighted.

* * * * *